Oct. 26, 1954  A. M. JONES  2,692,449
ARTIFICIAL FLOWER AND METHOD OF MAKING SAME
Filed March 26, 1952  4 Sheets-Sheet 1
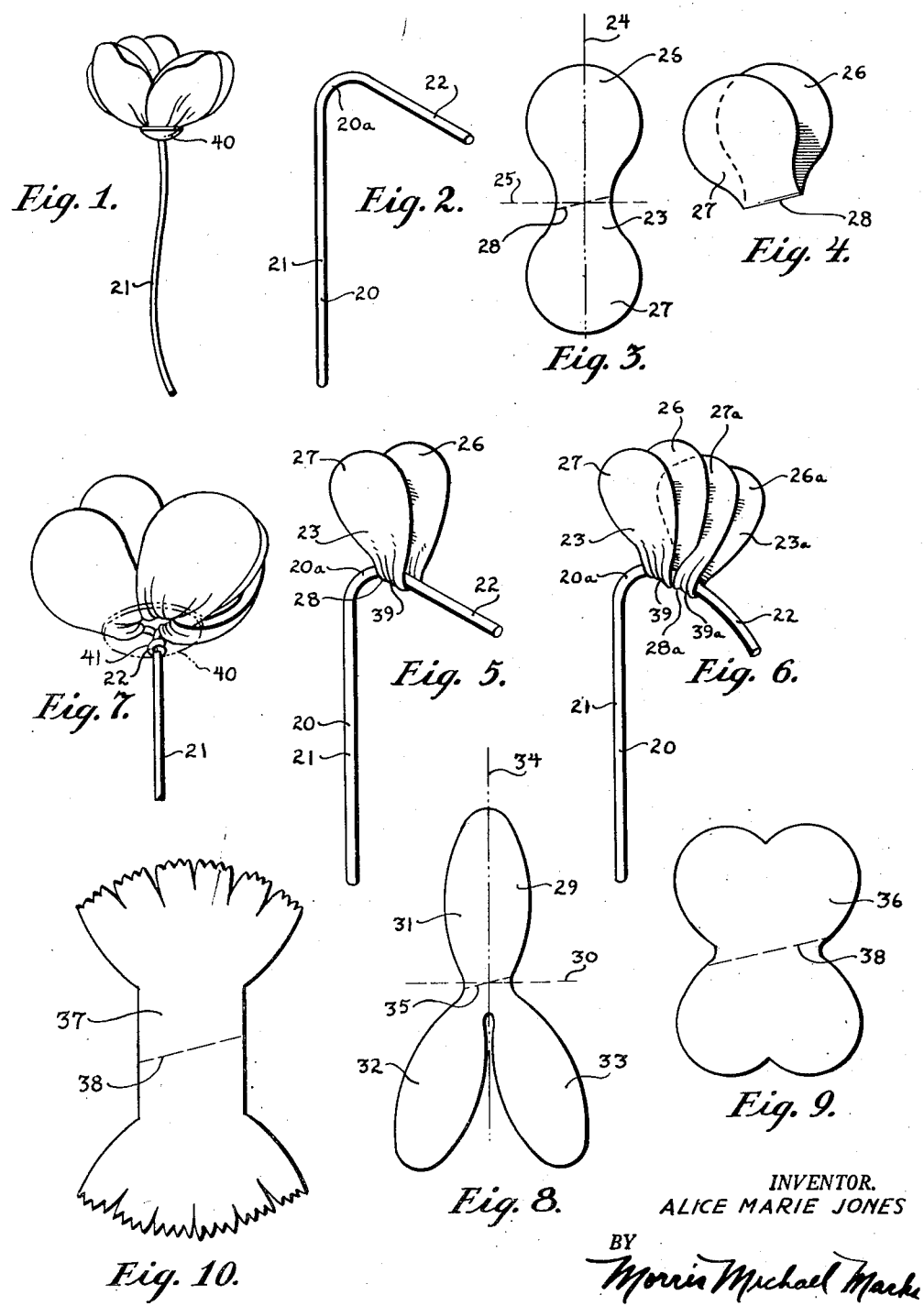
INVENTOR.
ALICE MARIE JONES
BY
Morris Michael Mark
ATTORNEY.

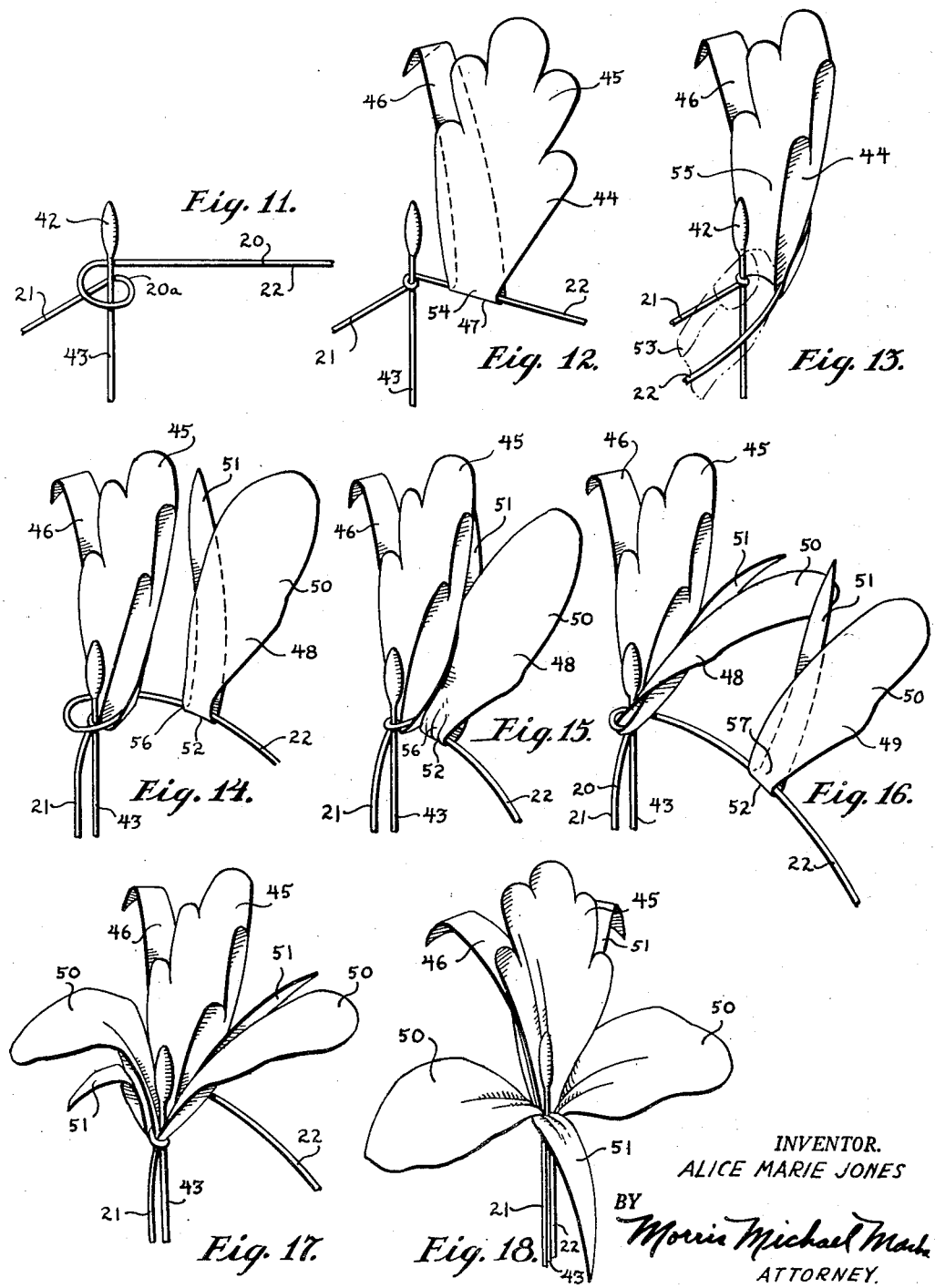

INVENTOR.
ALICE MARIE JONES
BY
ATTORNEY.

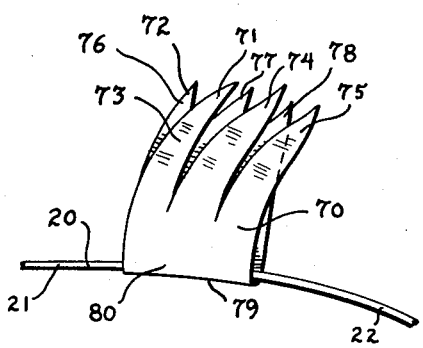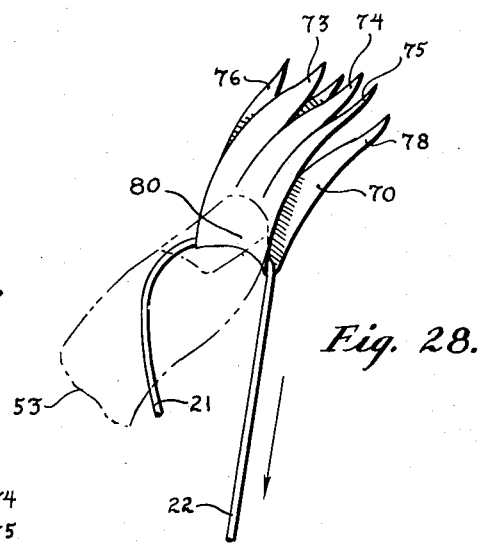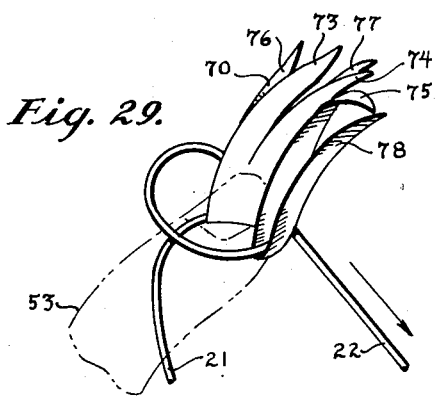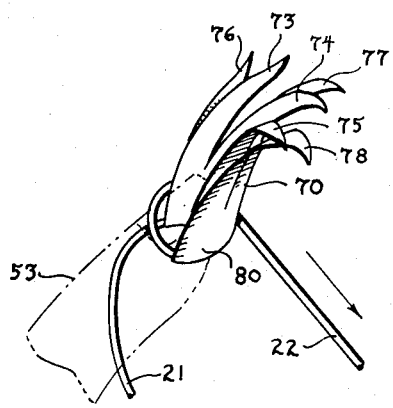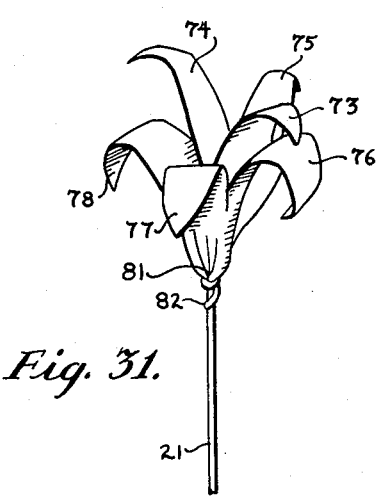

Patented Oct. 26, 1954

2,692,449

UNITED STATES PATENT OFFICE 2,692,449

ARTIFICIAL FLOWER AND METHOD OF MAKING SAME

Alice Marie Jones, Philadelphia, Pa., assignor of one-half to Donn Bennett, Rosemont, Pa.

Application March 26, 1952, Serial No. 278,591

8 Claims. (Cl. 41—13)

My invention relates to artificial flowers and the method of making same.

Artificial flowers as hitherto made, have entailed considerable bulk in that portion of the flower where the petals join the stem. This bulk has proven very undesirable, particularly because most natural flowers do not have such bulky calyxes where the petals join the stem. Moreover, it has been very difficult, if not impossible, in former methods of making artificial flowers, to so mount the petals as to give them the appearance of the original flower in nature. Furthermore, former methods of making artificial flowers have involved difficult processes, have been relatively expensive, and have often proven unreliable.

One object of my invention is to provide an artificial flower which will have the appearance of the original flower in nature, even in the shape and relative size of the calyx.

Another object of my invention is to provide a method of making artificial flowers which shall be easy to use and reliable in performance.

A further object of my invention is to provide an artificial flower which is inexpensive and quickly made.

With the above and other objects in view, my invention consists of an artificial flower comprising a unitary sheet material formed into oppositely disposed petals and folded with said petals in partially overlapping condition, said sheet material being mounted on a curved wire with said fold in substantial juxtaposition to said wire, and said fold being crimped thereon; said wire being curved and folded upon itself in proximity to said crimped fold.

My invention also consists of the parts, methods, and combinations of parts, of methods, and of parts and methods, as more fully hereinafter described.

For the purpose of illustrating my invention, I have shown in the accompanying drawings forms thereof which are at present preferred by me, since the same have been found in practice to give satisfactory and reliable results, although it is to be understood that the various instrumentalities of which my invention consists can be variously arranged and organized and that my invention is not limited to the precise arrangements and organizations of the instrumentalities as herein shown and described.

Referring to the drawings in which like reference characters indicate like parts:

Figure 1 represents an elevational view of an artificial flower made in accordance with my invention.

Figure 2 represents a perspective view of a wire used in mounting the petals of an artificial flower embodying my invention, said wire being shown in a somewhat enlarged condition for clarity of illustration.

Figure 3 represents a plan view of a sheet material formed into a petal-forming blank for use in making an artificial flower embodying my invention.

Figure 4 represents an elevational view of the petal-forming blank illustrated in Figure 3, but in folded and partially overlapping condition, in accordance with the method of making an artificial flower embodying my invention.

Figure 5 represents a perspective view of the petal-forming blank illustrated in Figure 4 mounted on the wire illustrated in Figure 2, in accordance with the method of making an artificial flower embodying my invention.

Figure 6 represents a perspective view similar to that shown in Figure 5, but with an additional petal-forming blank of substantially the same configuration and size as that illustrated in Figure 4, mounted on the wire and in proper conjunction with the original petal-forming blank mounted thereon, in accordance with the method of making an artificial flower embodying my invention.

Figure 7 represents a perspective view of an artificial flower made in accordance with the method illustrated in Figures 2 to 6 inclusive and embodying my invention, ready for the positioning of a calyx thereon.

Figure 8 represents a plan view of a petal-forming blank of modified construction embodying my invention.

Figure 9 represents a plan view of a petal-forming blank of further modified construction embodying my invention.

Figure 10 represents a plan view of a petal-forming blank of another modified construction embodying my invention.

Figure 11 represents a perspective view showing the beginning of the mounting of a pep in an artificial flower of modified construction embodying my invention.

Figure 12 represents a subsequent stage of the formation of an artificial flower of modified construction embodying my invention, and showing an early stage of incorporating one petal-forming blank therewith.

Figure 13 represents a further stage in the formation of an artificial flower of modified construction embodying my invention.

Figure 14 represents a still further stage of the formation of an artificial flower of modified construction embodying my invention and showing an early stage incorporating a second petal-forming blank therewith.

Figure 15 represents a later stage in the formation of an artificial flower of modified construction embodying my invention.

Figure 16 represents a subsequent stage in the formation of an artificial flower embodying my invention, and showing an early stage of incorporating a third petal-forming blank therewith.

Figure 17 represents a further stage in the formation of an artificial flower embodying my invention.

Figure 18 represents a further stage of an artificial flower embodying my invention, showing said flower as an orchid in substantially completed condition, and ready for the application of a stem covering.

Figure 27 represents an early stage in the formation of an artificial flower of modified construction embodying my invention, showing particularly an early stage of incorporating a petal-forming blank with a wire.

Figure 28 represents a subsequent stage in the formation of an artificial flower of modified construction embodying my invention.

Figure 29 represents a further stage in the formation of an artificial flower of modified construction embodying my invention.

Figure 30 represents a subsequent stage in the formation of an artificial flower of modified construction embodying my invention.

Figure 31 represents a further stage in the formation of an artificial flower of modified construction embodying my invention, and showing the same as a hyacinth blossom in substantially completed condition.

Figure 19:
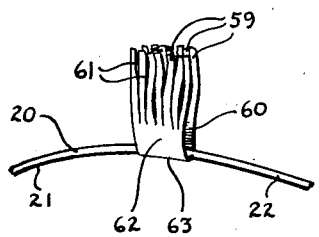
Figure 19 represents an early stage in the formation of an artificial flower of modified construction embodying my invention, showing particularly an early stage in forming and assembly of peps to be used in said flower.

According to my invention, I provide a length of wire 20 which in one preferred form may consist of Number 32 annealed wire. This wire is preferably divided by a bend 20a into a stem or holding end 21 and a working end 22.

I then provide a sheet material petal-forming blank 23 having a longitudinal axis 24 intermediate the side portions, and a median axis 25 perpendicular thereto. The petal-forming blank 23 is substantially twice the length of the desired petal of the flower to be formed and has an inner face and an outer face. The opposed ends 26 and 27 of the blank 23 are each formed into the shape and configuration of a petal desired on the flower, with the base of each of said petals extending toward the median axis 25 of the blank 23.

The blank 23 is then folded about a fold 28 which intercepts the intersection of the median axis 25 with the longitudinal axis 24, and is disposed at a slight angle to the median axis 25. The inner faces of each of the petal ends 26 and 27 of the blank 23 are then brought together into partially overlapping condition and in face-toward-face relation, substantially as is illustrated in Figure 4.

In flowers which have an odd number of petals, blanks such as that illustrated in Figure 8 may be utilized. This blank 29 has a median axis 30 on one side of which is formed a single petal 31, and on the other side of which two petals 32 and 33 may be disposed equidistantly of the longitudinal axis 34. The blank 29 is folded about a fold 35 which intercepts the junction of the median 30 and the longitudinal axes 34, and which is preferably disposed at a slight angle with respect to the median axis 30; and the petal 29 is thus folded against the petals 32 and 33 and in partially overlapping relation with respect thereto. Such petal-forming blanks may be used in a number of ways. Thus, they may be disposed on the wire end 22 with the double end and the single end, of the petal-forming blank 29, alternately disposed. Or, a blank such as the petal-forming blank 29 may be uesd in conjunction with one or more petal-forming blanks having an even number of petal ends thereon. Or any of various other combinations may be used as desired, and as required by the specific flower being formed.

Petals having a distinctive configuration such as that of the hydrangea or carnation are provided for by configurating the outer ends of the blank accordingly. Thus, in Figure 9 is illustrated a petal-forming blank 36 of a hydrangea, and in Figure 10 is illustrated a petal-forming blank of a carnation. In each case, the outer portions of the blanks are configurated according to the requirements of the flower being copied, and also in each case the blank is preferably folded about a fold 38 which intercepts the juncture of the median and longitudinal axes of the blank, and is preferably disposed at a slight angle to the median axis.

In Figures 1 to 6 inclusive, are illustrated a flower having an even number of petals formed according to the configuration of the petal-forming blank 23. There is thus provided a number of petal-forming blanks 23, 23a, etc. equal to half the number of petals required for the finished flower. The first petal-forming blank 23 is mounted on the working end 22 of the wire 20, with the fold 28 disposed beneath the wire and the petal ends 26 and 27 extended upwardly from the fold 28 to embrace the sides of the working end 22. The fold portion 28 may then be crimped into a compactly crimped bight 39 and disposed at that end of the working end 22 which is immediately adjacent the bend 20a of the wire 20. The next petal-forming blank 23a is then disposed with its fold 28a disposed immediately adjacent the outer end of the crimped bight 39, and beneath the adjacent portion of the working end 22, with the petal ends 26a and 27a disposed behind the petal ends 26 and 27 of the petal-forming blank 23 and with at least one petal end of the petal-forming blank 23a in at least partially overlapping relation to one petal end of the petal-forming blank 23. The fold portion 28a may then itself be crimped to form the compact crimped bight 39a, and at the same time pushed closely against the crimped bight 39 and toward the bend 20a of the wire 20.

Simultaneously with the mounting and crimping of the petal-forming blanks on the working end 22, the working end 22 is curved about a vertical axis and toward the bend 20a. Similar petal-forming blanks are similarly mounted on the working end 22 while said end is being increasingly curved toward the bend 20a until all of the petal-forming blanks have been thus mounted on the working end 22, whereupon the working end 22 is drawn tightly to a substantially minimum diameter, and the outer end thereof twisted about the holding end 21 of the wire 20 immediately beneath the bend 20a substantially as is illustrated in Figure 7. The petals may then be shaped in their ultimate position, and a suitable calyx 40 may if desired be passed upwardly avout vertical holding end 21, of the wire 20, until the calyx 40 substantially abuts the crimped bights, 28, 28a, etc. and covers the twisted end 41 of the working end 22. The flower is now complete, unless it is desired to cover the stem formed by the holding end 21 with any suitable wrapping as desired.

In cases where the flower has a characteristic center or pep, this center may be provided of any suitable material, and may first be mounted on the working end 22 before the petals are mounted in place thereon.

Thus, in Figures 11 to 18 inclusive are illustrated an orchid flower having a pep. This pep 42 comprises any desired center formation preferably mounted on a stalk 43. The stalk 43 is then positioned preferably within the fold 28a of the wire 20, and the working end 22 is looped thereabout and drawn tightly thereagainst, substantially as is illustrated in Figures 11 and 12.

A petal-forming blank 44 is provided with an orchid throat formation 45 at one end and an orchid fin formation 46 at the other end, and is folded as at 47 intermediate the bases of the throat formation 45 and fin formation 46 and preferably at an angle other than 90° to the longitudinal axis of the petal-forming blank 44. Preferably two additional petal-forming blanks 48 and 49 are provided, each having a wing formation 50 at one end and a fin formation 51 at the other end, and a fold 52 separating the bases of the wing and fin formation and disposed preferably at an angle other than 90° to the longitudinal axis of each respective petal-forming blank 48 and 49.

The petal-forming blank 44 is mounted on the working end 22 of the wire 20 with the fold 47 disposed beneath and preferably abutting the working end 22, and the throat formation 44 and the fin formation 46 embracing opposed sides of the working end 22 while being asymmetrically disposed in lapping relation to each other. In a preferred form, the throat formation 44 is disposed on the side of the working end 22 facing the stalk 43, and the fin formation 46 is disposed on the side facing away therefrom, and both the throat formation 45 and the fin formation 46 extend upwardly from the working end 22, while one edge of the throat formation 44 is adjacent the pep stalk 43. The operator's thumb 53 is then placed against the side 54 of the throat formation 44 immediately adjacent the working end 22, and is pressed thereagainst while the working end 22 is drawn toward the operator, substantially as is illustrated in Figure 13, thereby to shape the throat formation 44 substantially into a trough 55 with the fin formation 46 abutting the rear of the throat formation 45, and preferably curled at its upper end slightly away therefrom.

The working end 22 is then looped about the stalk 43, and the petal-forming blank 48 is mounted on the working end 22 substantially in the same manner as the mounting of the petal-forming blank 44, as illustrated in Figure 14. The petal-forming blank 48 is then pushed along the working end 22 and against one side of the petal-forming blank 44, crimping the base portion 56 of the petal-forming blank 48 adjacent the fold 52 thereof, and the working end 22 is simultaneously drawn tighter against the stalk 43, substantially as is illustrated in Figure 15.

The next petal-forming blank 49 is then placed on the working end 22 in substantially the same manner as the petal-forming blank 48, and the working end is crossed over the front of the throat formation 44 while the petal-forming blank 49 is pushed along the working end 22 and against the side of the throat formation 44 opposed to the side which abuts the petal-forming blank 48, thereby crimping the base portion 57 thereagainst, and the working end 22 is then looped back of the petal-forming blank 44 substantially as is illustrated in Figure 17. The working end is then drawn tightly, and is preferably tightly looped once more about the stalk 43 and holding end 21, whereupon it may be drawn downwardly in substantially abutting relation to said stalk 43 and holding end 21, substantially as is illustrated in Figure 17. The working end 22, holding end 21 and stalk 43 may then be covered in any suitable manner to simulate the stem of an orchid. If required, the throat 45, wings 50 and fins 46 and 51 may then be adjusted to their proper shape and position. The orchid is now complete.

Figure 20:
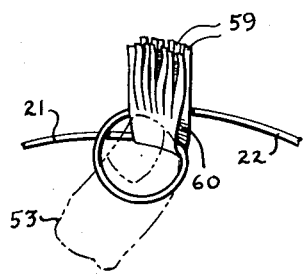
Figure 20 represents a subsequent stage in the formation and assembly of peps in an artificial flower of modified construction embodying my invention.
Figure 21:
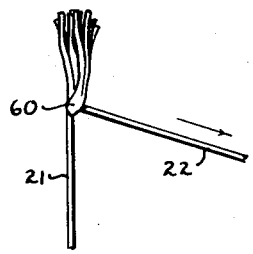
Figure 21 represents a later stage in the forming and assembly of peps of an artificial flower of modified construction embodying my invention.
Figure 22:
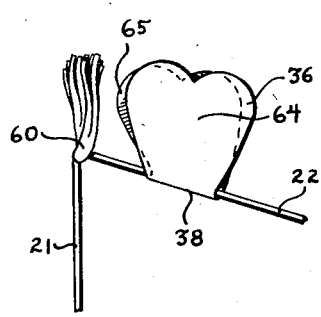
Figure 22 represents a further stage in the formation of an artificial flower of modified construction embodying my invention, and showing an early stage of an assembly of a petal-forming blank therewith.
Figure 23:
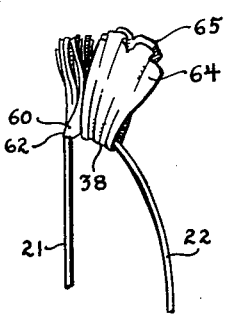
Figure 23 represents a subsequent stage in the formation of an artificial flower of modified construction embodying my invention.
Figure 24:
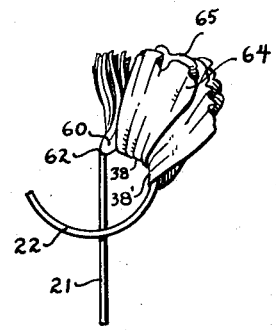
Figure 24 represents a further stage in the formation of an artificial flower of modified construction embodying my invention and showing particularly an assembly of a second petal-forming blank therewith.
Figure 25:
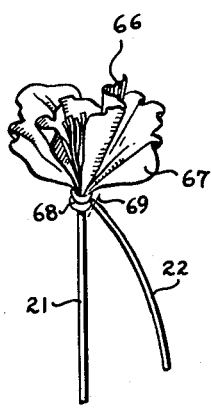
Figure 25 represents a subsequent stage in the formation of an artificial flower of modified construction embodying my invention.
Figure 26:
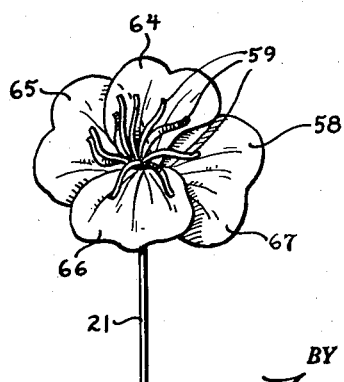
Figure 26 represents a further stage in the formation of an artificial flower of modified construction embodying my invention, and showing the same as a hydrangea blossom in substantially completed condition.

In Figures 19 to 26 inclusive are illustrated the formation of an artificial flower of modified construction embodying my invention, wherein the flower may consist of a hydrangea blossom 58 comprising a multiplicity of peps 59. In this construction, I provide a peps-forming blank 60 which is preferably of a length at least twice the desired length of the peps 59. The blank 60 is formed of any desired material, and has a series of peps 59 cut from its outer ends by means of slits 61 longitudinally formed from its outer ends toward the base portion 62. A median fold 63 is formed intermediate the outer ends of the blank 60, and the blank 60 is then disposed about the working end 22 of a wire 20 with the fold 63 immediately beneath and substantially abutting said working end 22, and the opposed ends of the blank 60 embracing said working end 22 and in substantially looping relation to each other. The thumb 53 is then depressed against the base portion 62 while the working end 22 is simultaneously looped thereabout, substantially as is illustrated in Figure 20, and the end 22 is then tightly drawn thereby causing the base portion 63 to be spirally wound about itself, substantially, as illustrated in Figure 21. Preferably two substantially identical petal-forming blanks 36 are provided with a fold 38 formed therein as previously described. The first petal-forming blank 36 comprises a petal end 64 and an opposed petal end 65. The second petal-forming blank comprises a petal end 66 and an opposed petal end 67. The first petal-forming blank 36 is disposed on the working end 22 with the fold 38 disposed beneath and generally abutting the working end 22, and the petal ends 64 and 65 upwardly projecting therefrom on opposed sides of the working end 22. The petal-forming blank 36 is then pushed against the peps-forming blank 60 and the fold portion 38 is crimped in the process. The next petal-forming blank 36 is then similarly mounted on the working end 22, and is pushed against the preceding petal-forming blank and the fold 38' of the second petal-forming blank is similarly crimped. The working end 22 is then again looped about the holding end 21 and drawn tightly thereagainst. The excess portion of the working end 22 may then be cut off immediately adjacent the loops 68, as at 69. The petal ends 64, 65, 66 and 67 and the peps 59 may then be shaped into proper position and the hydrangea blossom is complete, with the holding end 21 serving as the stem.

In Figures 27 to 31 inclusive are illustrated the formation of an artificial flower of further modified construction embodying my invention, wherein a hyacinth blossom is formed. In this construction, a petal-forming blank 70 is provided having opposed petal ends 71 and 72. Each of these ends preferably comprises three tine-shaped projections 73, 74, and 75, and 76, 77, 78 respectively. If desired, the petal ends 71 and 72 may be preliminarily treated in any well-known manner to cause the tines to curl. Thus, for instance, the back of a knife blade may be pressed against one side of a petal end while the thumb rests against the other side, and the blade and thumb may be drawn outwardly toward the outer ends of the tines. The petal-forming blank 70 is folded at 79 transversely of its median axis in the same manner as hereinbefore described for other petal-forming blanks, and is similarly mounted on the working end 22 of a wire 20. The thumb 53 is pressed against one side of the base portion 80 of the petal-forming blank 70 through which the working end 22 passes, and the working end 22 is drawn and looped about the holding end 21, thereby carrying with it, and looping, the petal-forming blank 70, substantially as is illustrated in Figures 28, 29 and 30. Continued drawing of the working end 22 causes the base portion 80 to abut against itself while on the wire 20, and to be compressed into a substantial crimp 81, thereby to form an upwardly extending bell-shaped flower substantially as is illustrated in Figure 31. The working end 22 may then be again looped about the holding end 21 and cut off as at 82. It will be found that in the process of looping the petal-forming blank 70 and crimping the base 81 thereof, the tines 73, 74, 75, 76, 77 and 78 are separated and curled outwardly substantially as is illustrated in Figure 31, thereby forming a hyacinth blossom having a stem 21.

It will thus be found that I have provided by my invention a novel method for forming artificial flowers, as well as a new and desirable artificial flower construction, whereby artificial flowers may be quickly, easily and inexpensively made, said flowers having an exceedingly life-like appearance with an absolute minimum of bulk in the calyx.

I am aware that the invention may be embodied in other specific forms without departing from the spirit or essential attributes thereof, and I therefore desire the present embodiments to be considered in all respects as illustrative and not restrictive, reference being had to the appended claims rather than to the foregoing description to indicate the scope of the invention.

Having thus described my invention, what I claim as new and desire to obtain by Letters Patent, is:

1. An artificial flower comprising a wire having a base portion and a stem portion, said base portion being substantially disposed in a plane substantially perpendicular to said stem portion, and a petal-forming blank having an outer face and an inner face, a transverse median axis, petals formed on opposed sides of said median axis, said petal-forming blank being folded about a fold intercepting said median axis at an angle thereto, with the outer portions of said inner face of said petal-forming blank being disposed in substantially partially overlapping face-toward-face condition; said base portion of said wire being disposed intermediate said partially overlapping portions and adjacent said fold.

2. An artificial flower comprising a wire having a base portion and a stem portion, said base portion being disposed in a plane substantially perpendicular to said stem portion, and a plurality of petal-forming blanks each having an outer face and an inner face, a transverse median axis, petals formed on opposed sides of said median axis, said petal-forming blank being folded about a fold intercepting said median axis at an angle thereto, with the outer portions of said inner face of said petal-forming blank being disposed in substantially partially overlapping face-toward-face condition; said base portion of said wire being disposed intermediate said partially overlapping portions and adjacent said fold of each petal-forming blank; and said folds being disposed adjacent one another on said wire while a petal end of one blank at least partially overlaps a petal end of an adjacent blank.

3. An artificial flower comprising a wire having a base portion and a stem portion, said base portion being substantially disposed in a plane substantially perpendicular to said stem portion, and a petal-forming blank having a transverse median axis, petals formed on opposite sides of said median axis, said petal-forming blank being folded about a fold intercepting said median axis at an angle thereto, with the outer portions of said petal-forming blank being disposed in substantially partially overlapping condition; said base portion of said wire being disposed intermediate said partially overlapping portions and adjacent said fold; said petal-forming blank being substantially crimped at said fold portion; said fold together with said wire disposed therein being disposed in a spiral.

4. An artificial flower comprising a wire having a base portion and a stem portion, said base portion being substantially disposed in a plane substantially perpendicular to said stem portion, a plurality of petal-forming blanks each having an outer face and an inner face, side portions and opposed end portions, petals formed on said opposed end portions, each of said petal-forming blanks being folded intermediate the opposed end portions thereof, with at least a portion of the inner face of the petal of one end portion substantially overlapping at least a portion of the inner face of the petal of the opposed end portion of said petal-forming blank and in substantially face-toward-face relation thereto; said base portion of said wire being disposed intermediate said overlapping portions and adjacent said fold of each of said petal-forming blanks; each of said petal-forming blanks being substantially crimped at said fold portion, with the sides thereof being substantially drawn toward each other; said crimped folds being disposed in tandem along said wire; and said wire being bent in a manner to maintain said fold portions in crimped condition and in place along said wire.

5. The method of forming an artificial flower comprising providing a wire having a stem portion and a working end portion and a plurality of petal-forming blanks; each of said blanks comprising opposed petal ends having their base portions extending toward the median axis of the petal-forming blank; folding said petal-forming blanks along an axis substantially intercepting said median axis; disposing each of said petal-forming blanks on said wire with the fold of the blank disposed beneath said wire and in substantially abutting relation thereto, and with said petal ends being disposed in substantially partially overlapping relation to each other; pushing the bases of said petal-forming blanks one against the other substantially along the axes of the folds thereof, and crimping said bases in the process, while bending said working end of said wire substantially about the axis of said stem portion, and twisting said wire substantially about a plane perpendicular to the axis of said stem portion so as to lock it.

6. The method of forming an artificial flower comprising providing a wire having a stem portion and a working end portion, and a petal-forming blank comprising an outer face and an inner face, opposed petal ends having their base portions extending toward the median axis of the petal-forming blank; folding said petal-forming blank along an axis substantially intercepting said median axis; disposing said petal-forming blank on said wire with the fold of the blank disposed beneath said wire and in substantially abutting relation thereto, and with said petal ends being disposed in substantially partially overlapping and inner face-toward-inner face relation to each other; crimping said fold while bending said working end portion of said wire substantially about the axis of said stem portion, and twisting said wire substantially about a plane perpendicular to the axis of said stem portion so as to lock it.

7. The method of forming an artificial flower comprising providing a wire having a stem portion and a working end portion, and a plurality of petal-forming blanks; each of said blanks comprising opposed petal ends and a median axis; folding each of said petal-forming blanks along an axis intercepting said median axis and intermediate said petal ends; disposing each of said petal-forming blanks on said working end portion of said wire with the fold of the blank disposed beneath said wire and in substantially abutting relation thereto, and with at least a portion of each of said petal ends being disposed in substantially overlapping relation to at least a portion of the other of said petal ends on said petal-forming blank; urging the bases of said petal-forming blanks one against the other in tandem substantially along the axis of the folds thereof, and crimping said bases in the process, while bending said working end portion of said wire substantially about the axis of said stem portion, and twisting said working end portion of said wire substantially about a plane perpendicular to the axis of said stem portion so as to lock it.

8. The method of forming an artificial flower comprising providing a wire having a stem portion and a working end portion and a petal-forming blank comprising an outer face and an inner face, opposed side portions and opposed petal end portions; folding said petal-forming blank along an axis substantially intermediate said petal end portions; disposing said petal-forming blank on said wire with the fold of the blank disposed beneath said wire and in substantially abutting relation thereto, and with the inner face of one of said petal end portions being disposed in substantially partial overlapping relation to the inner face of the other of said petal end portions and in substantially face-toward-face relation thereto; urging the opposed side portions of said petal-forming blank substantially toward each other along the axis of the fold thereof, and crimping said fold in the process, while bending said wire in a loop and drawing said loop together; and twisting said working end of said wire substantially about a plane perpendicular to the axis of said stem portion so as to lock it.

References Cited in the file of this patent

UNITED STATES PATENTS

| Number | Name | Date |
| --- | --- | --- |
| 1,879,677 | Gockel | Sept. 27, 1923 |